US011634537B2

(12) United States Patent
Herold et al.

(10) Patent No.: US 11,634,537 B2
(45) Date of Patent: Apr. 25, 2023

(54) POLYMERIZABLE COMPOSITION FOR OPTICAL ARTICLES AND OPTICAL ARTICLES MADE THEREFROM

(71) Applicant: Arkema Inc., King of Prussia, PA (US)

(72) Inventors: Robert D. Herold, Monroeville, PA (US); Marco Herrera, Pittsburgh, PA (US); Thomas H. Kozel, Pottstown, PA (US); Leonard H. Palys, Downingtown, PA (US); Brandy Slezak, Export, PA (US); Bruno Georges Van Hemelryck, Chaponost (FR)

(73) Assignee: Arkema Inc., King of Prussia, PA (US)

( * ) Notice: Subject to any disclaimer, the term of this patent is extended or adjusted under 35 U.S.C. 154(b) by 495 days.

(21) Appl. No.: 16/956,650

(22) PCT Filed: Dec. 18, 2018

(86) PCT No.: PCT/US2018/066204
§ 371 (c)(1),
(2) Date: Jun. 22, 2020

(87) PCT Pub. No.: WO2019/133335
PCT Pub. Date: Jul. 4, 2019

(65) Prior Publication Data
US 2021/0070931 A1   Mar. 11, 2021

Related U.S. Application Data

(60) Provisional application No. 62/610,597, filed on Dec. 27, 2017.

(51) Int. Cl.
*C08G 64/02* (2006.01)
*C08F 18/24* (2006.01)
*C08G 64/22* (2006.01)

(52) U.S. Cl.
CPC .......... *C08G 64/0291* (2013.01); *C08F 18/24* (2013.01); *C08G 64/226* (2013.01)

(58) Field of Classification Search
CPC .... C08G 64/0291; C08G 64/226; C08F 18/24
See application file for complete search history.

(56) References Cited

U.S. PATENT DOCUMENTS

| 5,319,007 A | 6/1994 | Bright |
| 5,760,149 A * | 6/1998 | Sanchez ................ C08F 279/02 |
| | | 558/263 |
| 6,476,149 B1 | 11/2002 | Krupinski |
| 2005/0256216 A1 | 11/2005 | Berti et al. |
| 2017/0066876 A1 * | 3/2017 | Herold ............... C08G 64/0291 |

FOREIGN PATENT DOCUMENTS

WO    WO 98/07684    2/1998

* cited by examiner

*Primary Examiner* — Christopher M Rodd
(74) *Attorney, Agent, or Firm* — Lynn B. Morreale

(57) ABSTRACT

The present invention is directed to a polymerizable composition comprising (A) a reaction product of: (a) diethyleneglycol bischloroformate, ethyleneglycol bischloroformate, or combinations thereof; (b) allyl alcohol; (c) optionally, a cyclic polyol selected from the group consisting of a cycloaliphatic polyol having at least one secondary hydroxyl group, a heterocyclic polyol having primary and/or secondary hydroxyl groups, and mixtures thereof; and (d) optionally, at least one linear or branched aliphatic polyol having two to six hydroxyl groups; and (B) an organic peroxide comprising at least three peroxide groups. A polymerizate and/or an optical article comprising the polymerizable compositions of the invention are also provided.

23 Claims, No Drawings

POLYMERIZABLE COMPOSITION FOR OPTICAL ARTICLES AND OPTICAL ARTICLES MADE THEREFROM

CROSS-REFERENCE TO RELATED APPLICATIONS

This application is a national stage application under 35 U.S.C. § 371 of PCT/US2018/66204 filed, Dec. 18, 2018 which claims benefit to U.S. patent application Ser. No. 62/610,597, filed on Dec. 27, 2017, incorporated herein by reference.

FIELD OF THE INVENTION

This invention relates generally to a polymerizable composition and to a polymerizate, which are particularly well suited for optical articles.

BACKGROUND OF THE INVENTION

Polymerizable monomer compositions are currently used in the optics industry to make optical articles, such as contact and ophthalmic lenses. These compositions typically include radical polymerizable monomers and an initiator, and may also include soluble dyes. Presently available monomer compositions require long cure cycles and/or result in undesired exothermic reactions. Additionally, the soluble dyes are not stable in the presence of current initiators used and result in dye degradation.

Therefore, it would be desirable to provide a polymerizable composition that overcomes these problems, and possesses quicker cure times, better viscosity build rates, and soluble dye survivability.

SUMMARY OF THE INVENTION

The present invention is directed to a polymerizable composition comprising (A) a reaction product of: (a) diethyleneglycol bischloroformate, ethyleneglycol bischloroformate, or combinations thereof; (b) allyl alcohol; (c) optionally, a cyclic polyol selected from the group consisting of a cycloaliphatic polyol having at least one secondary hydroxyl group, a heterocyclic polyol having primary and/or secondary hydroxyl groups, and mixtures thereof; and (d) optionally, at least one linear or branched aliphatic polyol having two to six hydroxyl groups; and (B) an organic peroxide comprising at least three peroxide groups.

A polymerizable composition, comprising (A) a radically polymerizable monomer represented by Formula I:

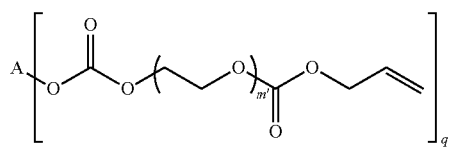

wherein A represents a residue from at least one cyclic polyol, m' is equal to 1 or 2, and q is equal to the number of hydroxyl groups on the at least one cyclic polyol; and (B) an organic peroxide comprising at least three peroxide groups.

A polymerizate and/or an optical article comprising the polymerizable compositions of the invention are also provided.

DETAILED DESCRIPTION OF THE INVENTION

The invention comprises, consists of, or consists essentially of the following aspects of the invention, in any combination.

The present invention relates to a polymerizable composition for preparing optical articles. The present invention also relates to polymerizates obtained from the compositions.

The present invention is directed to a polymerizable composition comprising (A) a reaction product of: (a) diethyleneglycol bischloroformate, ethyleneglycol bischloroformate, or combinations thereof; (b) allyl alcohol; (c) optionally, a cyclic polyol selected from the group consisting of a cycloaliphatic polyol having at least one secondary hydroxyl group, a heterocyclic polyol having primary and/or secondary hydroxyl groups, and mixtures thereof; and (d) optionally, at least one linear or branched aliphatic polyol having two to six hydroxyl groups; and (B) an organic peroxide comprising at least three peroxide groups. As used herein, the "reaction product" comprises one or more compounds comprising the residue of one or more of the reactants (a) through (d) above, and the reaction product may serve as monomer(s), or monomer composition, for use in the polymerizable composition that react and form a polymerizate upon cure of the polymerizable composition. As used herein, the lettering (a), (b), (c), (d) or (e) is used for the purposes of organization of the components of the reaction product described herein only, possesses no other meaning, and are not necessarily used consistently for the description of different reaction products described below.

For example, the invention can comprise a polymerizable composition comprising the reaction product of (a) diethyleneglycol bischloroformate; (b) allyl alcohol; (c) a cyclic polyol selected from the group consisting of a cycloaliphatic polyol having at least one secondary hydroxyl group, a heterocyclic polyol having primary and/or secondary hydroxyl groups, and mixtures thereof; (d) optionally, ethyleneglycol bischloroformate; and (e) optionally, at least one linear or branched aliphatic polyol having two to six hydroxyl groups.

The amount of allyl alcohol, cyclic polyol, and linear or branched aliphatic polyol are relative to the total amount of all bischloroformates that are present. For example, allyl alcohol can be present in the range of 0.4 to 1.99 equivalent (eq.) of OH to 1 eq. of chloroformate, such as 0.8 to 1.2 eq. of OH to 1 eq. of chloroformate. For example, a minimum amount of allyl alcohol can be present in the range of 0.4 to 0.7 eq. of OH to 1 eq. of chloroformate.

The cyclic polyol can be present in the range of 0.01 to 0.6 eq. of OH to 1 eq. of chloroformate, such as 0.05 to 0.3 eq. of OH to 1 eq. of chloroformate.

If present, the optional ethyleneglycol bischloroformate can be present in the range of 0.01 to 0.99 eq. of chloroformate, given that the total number of equivalents of chloroformate of all bischloroformate compounds is 1.

If present, the optional at least one linear or branched aliphatic polyol can be present in the range of 0.01 to 0.6 eq. of OH to 1 eq. of chloroformate. For example, two aliphatic polyols, ethylene glycol and diethylene glycol can both be present. For example, ethylene glycol can be present in the range of 0.025 to 0.1 eq. of OH to 1 eq. of chloroformate and diethylene glycol can be present in the range of 0 to 0.1 eq. of OH to 1 eq. of chloroformate.

For example, the polymerizable composition can also comprise the reaction product of (a) allyl alcohol; (b) a cyclic polyol selected from the group consisting of a cycloaliphatic polyol having at least one secondary hydroxyl group, a heterocyclic polyol having primary and/or secondary hydroxyl groups, and mixtures thereof; (c) ethyleneglycol bischloroformate; and (d) optionally, at least one linear or branched aliphatic polyol having two to six hydroxyl groups.

The amount of allyl alcohol, cyclic polyol, and linear or branched aliphatic polyol present are relative to the amount of ethyleneglycol bischloroformate that is present.

Allyl alcohol can be present in the range of 0.4 to 1.99 eq. of OH to 1 eq. of chloroformate. For example, a minimum amount of allyl alcohol present can be in the range of 0.4 to 0.7 eq. of OH to 1 eq. of chloroformate.

The cyclic polyol can be present in the range of 0.01 to 0.6 eq. of OH to 1 eq. of chloroformate.

If present, the optional at least one linear or branched aliphatic polyol can be present in the range of 0.01 to 0.6 eq. of OH to 1 eq. of chloroformate.

For the polymerizable compositions of the invention, the allyl group of the allyl alcohol can be substituted or unsubstituted, as represented by the following general Formula III, $H_2C=C(R_7)-CH_2-OH$, wherein $R_7$ is hydrogen, halogen (e.g., chlorine or bromine), or a $C_1$ to $C_4$ alkyl group (e.g., methyl or ethyl).

The cyclic polyol can be a cycloaliphatic polyol. For example, the cycloaliphatic polyol can be monocyclic, polycyclic, or fused ring cycloaliphatic polyol. The cycloaliphatic polyol can have at least one secondary hydroxyl group. The cycloaliphatic polyol can have at least one hydroxyl group bonded directly to a cyclic ring of the polyol, such as cyclohexane diol. The monocyclic cycloaliphatic polyol can be a cyclohexane diol, for example, 1,4-cyclohexane diol, 1,3-cyclohexane diol, or 1,2-cyclohexane diol; cyclohexane triol, for example, 1,3,5-cyclohexane triol or 1,2,3-cyclohexane triol; cyclohexane tetrol; cyclohexane pentol; cyclohexane hexol; or cyclopentane diol, for example, 1,3-cyclopentane diol or 1,2-cyclopentane diol. The polycyclic cycloaliphatic polyol can be, for example, a bicyclo[2.2.1]heptane diol.

The cyclic polyol can also be a heterocyclic polyol. The heterocyclic polyol can have primary and/or secondary hydroxyl groups. The heterocyclic polyol heteroatoms can be, but are not limited to, sulfur, nitrogen, and/or oxygen. For example, the heterocyclic polyol can be 1,3,5-tris(2-hydroxyethyl)isocyanurate. The heterocyclic polyol can also be isohexide selected from the group consisting of isosorbide, isoidide, and isomannide. Isosorbide, isoidide, and isomannide can be D or L stereochemical configurations. As will be appreciated by one skilled in the art, one or more than one cyclic polyol can be present in the polymerizable composition.

The linear or branched aliphatic polyol can be a $C_2$-$C_{12}$ polyol with two to six hydroxyl groups. The linear or branched aliphatic polyol can contain heteroatoms such as, but are not limited to, sulfur, nitrogen, and/or oxygen. The linear or branched aliphatic polyol can be selected from the group consisting of ethylene glycol, diethylene glycol, propylene glycol, 1,3-propanediol, 1,2-butanediol, 1,4-butanediol, neopentyl glycol, 2-methyl-1,3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures of any of the foregoing. As will be appreciated by one skilled in the art, if present, one or more than one linear or branched aliphatic polyol can be used. For example, ethylene glycol can be used alone. Or, for example, ethylene glycol and diethylene glycol can be used together.

For example, the composition can include diethylene glycol bischloroformate in an amount to provide 1 equivalent of chloroformate, allyl alcohol in an amount to provide in the range of 0.8 to 1.2 eq. of OH, ethylene glycol in an amount to provide 0.05 eq. of OH, and D-Isosorbide in an amount to provide 0.15 eq. of OH.

As another example, the composition can include diethyleneglycol bischloroformate in an amount to provide 1 equivalent of chloroformate, allyl alcohol in an amount to provide in the range of 0.8 to 1.2 eq. of OH, ethylene glycol in an amount to provide 0.0667 eq. of OH, diethylene glycol in an amount to provide 0.0667 eq. of OH, and D-Isosorbide in an amount to provide 0.10 eq. of OH.

The equivalents ratio of total equivalents of hydroxyls to total equivalents of chloroformate can be in the range of 1 to 2:1, such as 1 to 1.5:1 or 1 to 1.3:1. The hydroxyls present in the mixture are from the allyl alcohol and polyols.

The polymerizable composition of the present invention can further comprise an additional component. For example, the additional component can be selected from the group consisting of triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

The reaction product of the polymerizable composition can comprise at least one compound represented by:

(a) Formula I

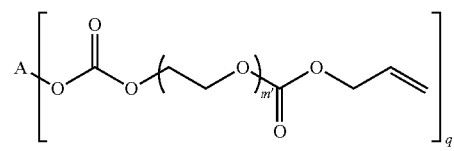

in which A represents a residue from the at least one cyclic polyol, m' is equal to 1 or 2, and q is equal to the number of hydroxyl groups on the at least one cyclic polyol; and (b) at least one of Formula II

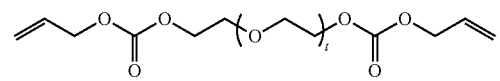

in which t is equal to 0 or 1. The reaction product can include a mixture of Formula II where t is equal to 0 and t is equal to 1.

The reaction product of the polymerizable composition can also comprise at least one compound represented by:
(a) Formula I'

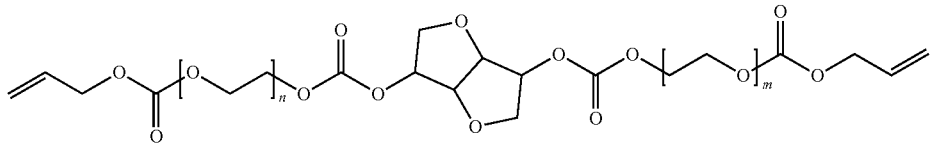

in which m and n are each independently 1 or 2; and
(b) at least one of Formula II in which t is equal to 0 or 1. The reaction product can include a mixture of Formula II where t is equal to 0 and t is equal to 1.

When at least one linear or branched aliphatic polyol is present, the reaction product of the polymerizable composition can comprise at least one compound represented by:
(a) Formula I in which A represents a residue from the at least one cyclic polyol, m' is equal to 1 or 2, and q is equal to the number of hydroxyl groups on the at least one cyclic polyol; and
(b) Formula II'

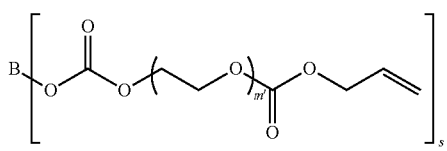

in which B represents a residue from the at least one linear or branched aliphatic polyol, m' is equal to 1 or 2, and s is equal to the number of hydroxyl groups on the at least one linear or branched aliphatic polyol; and
(c) at least one of Formula II in which t is equal to 0 or 1. The reaction product can include a mixture of Formula II where t is equal to 0 and t is equal to 1.

When at least one linear or branched aliphatic polyol is present, the reaction product of the polymerizable composition can also comprise at least one compound represented by:
(a) Formula I' in which m and n are each independently 1 or 2; and
(b) Formula II' in which B represents a residue of the at least one linear or branched aliphatic polyol, m' is equal to 1 or 2, and s is equal to the number of hydroxyl groups on the at least one linear or branched aliphatic polyol; and
(c) at least one of Formula II in which t is equal to 0 or 1. The reaction product can include a mixture of Formula II where t is equal to 0 and t is equal to 1.

The reaction product may also contain higher order oligomers of the composition components and/or small amounts of unreacted or partially reacted components.

A suitable commercially available monomer composition comprising the reaction product described above includes CR-39® NLS, commercially available from PPG Industries.

According to the present invention, the polymerizable composition may further comprise an organic peroxide comprising at least three peroxide groups. As used herein, the term "organic peroxide" refers to an organic compound comprising peroxide functional groups (ROOR'). The organic peroxide may function as an initiator in the polymerizable composition. As used herein, the term "initiator" refers to a compound capable of generating free radicals to facilitate polymerization of the polymerizable composition of the invention. A suitable commercially available organic peroxide includes Luperox® JWEB™ 50, available from ARKEMA.

The organic peroxide may comprise an organic peroxide branched oligomer comprising at least three peroxide groups. At least one peroxide group of the organic peroxide may comprise at least one moiety selected from the group consisting of peroxycarbonates, peroxyketals and peresters.

The organic peroxide may comprise a compound represented by structure A:

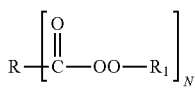

wherein N is an integer from 3 to 4; $R_1$ is each independently a tertiary-alkyl radical group having from 4 to 10 carbons; and R is a polyether compound having three to four branched alkyloxy radical groups. The branched alkyloxy radical groups of the polyether compound R may be selected from $CH_3-C(CH_2-O-)_3$, $C(CH_2-O-)_4$, and R may have a structure according to structure B or structure C:

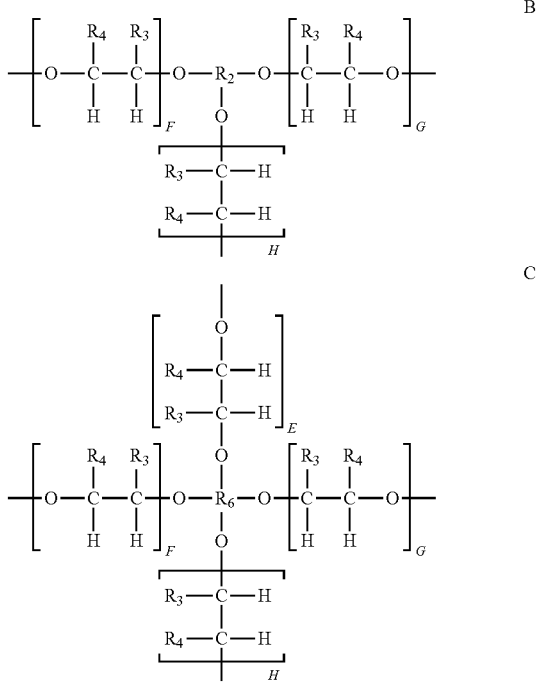

wherein $R_2$ is a branched trifunctional alkyl radical having the structure $CH_3$—$C(CH_2$—$)_3$, or a branched trifunctional alkyl radical having the structure

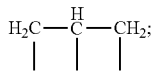

$R_6$ is a branched tetrafunctional alkyl radical having the structure $C(CH_2$—$)_4$; $R_3$ and $R_4$ are independently selected from hydrogen and alkyl radicals containing 1 to 4 carbons; and E, F, G and H are integers from 1 to 4.

The organic peroxide may comprise a tri(mono-t-alkylperoxycarbonate) compound, such as a tri(mono-t-butylperoxycarbonate) compound, or a tetra(mono-t-alkylperoxycarbonate) compound, such as a tetra(mono-t-butylperoxycarbonate) compound. The organic peroxide may comprise a polyether tetrakis(mono-t-alkylperoxycarbonate), such as a polyether tetrakis(mono-t-butylperoxycarbonate) compound, and may comprise a compound represented by structure D:

temperatures less than 100° F. (38° C.), and specifically refers to a temperature of about 77° F. (25° C.). An organic peroxide will have ambient temperature storage stability for a defined period, if, after storage of the organic peroxide at ambient temperature for the defined period, the measured % assay of the organic peroxide remains within the % peroxide product assay range listed in the sales specification provided by the manufacturer. For example, if an organic peroxide has been given a sales specification of 50.0% to 52.0% assay, the measured peroxide % assay should fall within this specific range after being stored at ambient temperatures for a defined period, e.g., six months. The % peroxide assay may be determined according to the following formula:

% Peroxide Assay=% A[O]*MW/(16*G)

wherein % A[O] is % active oxygen of the organic peroxide, MW is the theoretical molecular weight of the organic peroxide in g/mole, and G is the total number of peroxide groups (O—O) that the organic peroxide contains. The % A[O] may be determined by first determining the total % active oxygen of the stored organic peroxide, such as according to ASTM E 1228-88, and then subtracting from

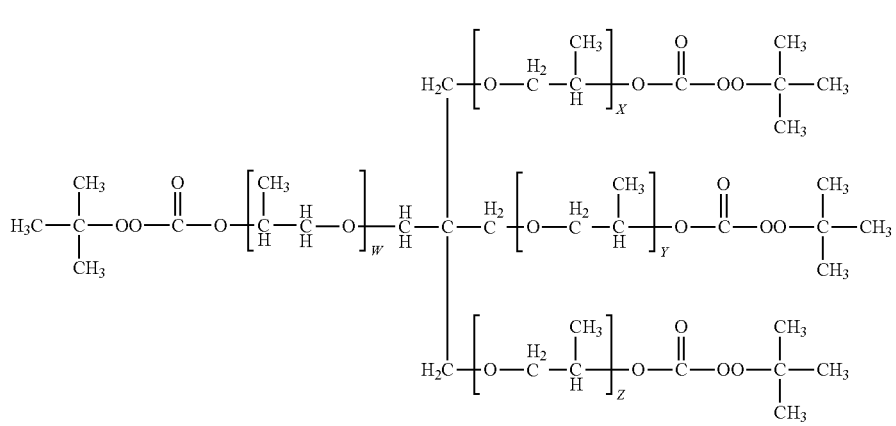

wherein the sum of W, X, Y and Z is 6 or 7.

The organic peroxide may comprise the reaction product of (1) a t-alkyl hydroperoxide comprising 4 to 12 carbons; and (2) a polyether tetrakis chloroformate comprising the reaction product of phosgene and a polyether tetrol.

The organic peroxide may have a theoretical molecular weight of at least 400 g/mole, such as at least 600 g/mole, such as at least 700 g/mole, such as at least 800 g/mole, and may have a theoretical molecular weight of no more than 3,500 g/mole, such as no more than 2,500 g/mole, such as no more than 2,000 g/mole, such as no more than 1,500 g/mole. The organic peroxide may have a theoretical molecular weight of 400 to 3,500 g/mole, such as 600 to 2,500 g/mole, such as 700 to 2,000 g/mole, such as 800 to 1,500 g/mole. The theoretical organic peroxide molecular weight can be calculated from the final organic peroxide structure, counting the total number of carbons, hydrogens and oxygen atoms using 12.011 g/mole for each carbon; 1.008 g/mole for each hydrogen and 15.999 g/mole for each oxygen atom as taken from the atomic molecular weights provided in the Periodic Table of the Elements.

The organic peroxide may have an ambient temperature storage stability of at least two months, such as at least three months, such as at least four months, such as at least five months. As used herein, "ambient temperature" refers to the total % active oxygen the total amount of residual active oxygen from impurities, such as t-alkyl hydroperoxides used in synthesizing the organic peroxide. The total amount of residual active oxygen in the organic peroxide is typically reported by the organic peroxide manufacturer in a certificate of analysis and may be determined by methods known in the art. An exemplary procedure to measure residual t-butyl active oxygen is as follows: A t-butyl impurities standard solution may be prepared by combining 0.03 g of t-butyl alcohol standard, 0.03 g of t-butyl hydroperoxide standard and 0.03 g of di-t-butyl peroxide standard in 100 mL of gas chromatographic grade hexane. A sample solution may be prepared by mixing 1 g of the organic peroxide sample with 10 mL of gas chromatographic grade hexane. The measurements may be taken using a Agilent 6890 (operating parameters: 1. Oven temperature 1 (35° C.); 2. Initial time (3 min); 3. Rate 1 (7° C./min); 4. Temperature 1 (85° C.); 5. Time (1 min); 6. Rate 2 (20° C./min); 7. Temperature 2 (180° C.); 8. Time 2 (5 min); 9. Injection port temperature (60° C.); 10. Detector temperature (300° C.); 11. Carrier flow (10 mL/min)). The GC may be calibrated by injecting 0.2 μL of each standard solution until the peak areas between two consecutive injections agree within 1% relative, and the instrument is calibrated using the last injection. After calibration, 0.2 μL of the organic peroxide sample solution may be injected. The t-butyl alcohol content may be calculated according to the following formula:

$$TBA = \frac{A * W_{Std} * P}{A_{Std} * W * 10}$$

wherein TBA is the concentration of t-butyl alcohol (%); A is the area of the TBA peak in the sample chromatogram (counts); $A_{Std}$ is the area of the TBA peak in the standard chromatogram (counts); W is the sample weight (g); $W_{Std}$ is the weight of the TBA in the standard solution (g); P is the purity of the TBA standard (%); and 10 is the dilution factor. The t-butyl hydroperoxide content may be calculated according to the following formula:

$$TBHP = \frac{A * W_{Std} * P}{A_{Std} * W * 10}$$

wherein TBHP is the concentration of t-butyl hydroperoxide (%); A is the area of the TBHP peak in the sample chromatogram (counts); $A_{Std}$ is the area of the TBHP peak in the standard chromatogram (counts); W is the sample weight (g); $W_{Std}$ is the weight of the TBHP in the standard solution (g); P is the purity of the TBHP standard (%); and 10 is the dilution factor. The di-t-butyl peroxide content may be calculated according to the following formula:

$$DTBP = \frac{A * W_{Std} * P}{A_{Std} * W * 10}$$

wherein DTBP is the concentration of di-t-butyl peroxide (%); A is the area of the DTBP peak in the sample chromatogram (counts); $A_{Std}$ is the area of the DTBP peak in the standard chromatogram (counts); W is the sample weight (g); $W_{Std}$ is the weight of the DTBP in the standard solution (g); P is the purity of the DTBP standard (%); and 10 is the dilution factor.

The organic peroxide may have a 60-minute half-life temperature above 99° C. The 60-minute half-life temperature of the organic peroxide may be calculated from the known or determined Arrhenius parameters or determined by confirming that more than 50% of the original peroxide concentration is not lost when the peroxide is heated at 99° C. for 60 minutes. This can be directly measured using dilute solution kinetics (0.1M to 0.2M peroxide concentration) in an appropriate solvent; placing said peroxide solution in a 99° C. bath for 60 minutes, immediately chilling that solution and then measuring the peroxide concentration using the % peroxide assay methods described in this invention. If more than 50% of the original peroxide concentration remains, that peroxide is confirmed to have a 60-minute half-life above 99° C.

The amount of organic peroxide used to initiate and polymerize the polymerizable compositions of the invention may vary depending upon the desired properties of the polymerizate end product. An initiating amount of the organic peroxide, i.e., the amount needed to initiate and sustain the polymerization reaction, may be utilized. The organic peroxide may be present in the polymerizable composition in an amount of at least 0.1% by weight, such as at least 0.5% by weight, such as at least 1% by weight, such as at least 1.4% by weight, such as at least 1.5% by weight, and may be present in an amount of no more than 5% by weight, such as no more than 3% by weight, such as no more than 2% by weight, such as no more than 1.6% by weight, such as no more than 1.5% by weight, based on the total composition weight. The organic peroxide may be present in the polymerizable composition in an amount of 0.1% to 5% by weight, such as 0.5% to 3% by weight, such as 1% to 2% by weight, such as 1.4% to 1.6% by weight, based on the total composition weight. The amount of organic peroxide and the consequent cure cycle may be selected to produce a polymerizate having a Fischer microhardness of at least 5, such as at least 10, such as at least 15, such as at least 20. The Fischer microhardness may be, e.g., in the range of 20 to 200, such as 70 to 200. The Fischer microhardness may be determined by testing according to ISO 14577-07 using a FISCHERSCOPE® H-100SMC available from Fischer Technology, Inc. Typically, the cure cycle involves heating the polymerizable composition from room temperature up to a temperature in the range of 75 to 130° C. over a period of 15 hours to 30 hours.

The polymerizable composition may comprise a dye. The dye may comprise a soluble dye. Suitable soluble dyes include those known in the art. For example, the soluble dye may comprise anthraquinone dye such as MACROLEX® Violet 3R (available from LANXESS).

According to the present invention, the soluble dye may be stable in the presence of the organic peroxide, i.e., the organic peroxide does not degrade the soluble dye in the polymerizable composition, and may be referred to as dye survivability. The stability of the soluble dye in the presence of the organic peroxide as compared to other initiators may be demonstrated by comparing the color of polymerizates having similar thicknesses derived from compositions having the same amount of dye but different initiators. One of skill in the art understands that polymerizate color parameters are affected by sample thickness and it is valid to compare the color parameters of different samples at similar thicknesses. For example, the a* and b* values may be measured to determine the color properties of the polymerizate resulting from the polymerizable composition. If anthraquinone dye such as the red anthraquinone dye MACROLEX® Violet 3R is used as the soluble dye, the measured a* and/or b* values may be improved compared to other systems that result in dye degradation. The a* and b* values may be measured according to ASTM E313-10 using a Hunterlab Ultrascan XE/Sphere Spectrocolorimeter (Serial #: 1292). The polymerizable composition may comprise the organic peroxide initiator and an anthraquinone dye such as the red anthraquinone dye MACROLEX® Violet 3R dye, and the MACROLEX® Violet 3R dye may improve the a* value as measured according to ASTM E313-10 upon cure of the polymerizable composition compared to an equivalent composition that does not include the dye. Comparable compositions using the same amount of dye with a different initiator may not improve the a* and/or b* value as much as the compositions of the present invention. Both a* and b* can have values ranging from negative to positive. For a* positive means more red and negative means more green, and is most pertinent to dyes in the red and green color space. For b* positive means more yellow and negative means more blue, and is most pertinent to dyes in the blue and yellow color space. With respect to the present invention, bluish or purple are the most desirable colors, and, accordingly, for a* an improved value means a less negative number or a more positive number, and for b* an improved value means a less positive number or more negative number. With a red dye such as red anthraquinone dye MACROLEX® Violet 3R, an improved a* value indicates more expression of the dye due to increased dye survival during polymerization; i.e., improved stability of the dye. The stability of the dye towards the organic peroxide was an unexpected and surprising result.

Various conventional additives may be incorporated into the polymerizable composition of the invention. Such conventional additives may include light stabilizers, heat stabilizers, ultraviolet light absorbers, mold release agents, pigments, flexibilizing additives that are not radically polymerizable, e.g., alkoxylated phenol benzoates and poly (alkylene glycol) dibenzoates, antioxidants such as hindered phenol antioxidants, and polymerization inhibitors or shelf-life stabilizers such as 4-methoxyphenol (MEHQ), 2,6-bis (1,1-dimethylethyl)-4-methylphenol (BHT), or triphenyl phosphite. Conventional additives may be present in amounts totaling less than 10 percent by weight, such as less than 5 percent by weight, such as less than 3 percent by weight, based on the total weight of the polymerizable composition.

According to the present invention, the polymerizable composition may have a gel time of less than 100 minutes when heated to a temperature of 100° C. and an organic peroxide level of 1.5% by weight, based on the total composition weight. As used herein, the "gel time" of the polymerizable composition may be determined as more fully described in the Examples section below.

According to the present invention, the polymerizable composition may not exhibit a detectable exotherm during cure, i.e., during polymerization of the polymerizable composition by, for example, heating in an oven. As used herein, a polymerizable composition does not exhibit a detectable exotherm during cure if the temperature of the polymerizable composition does not increase to a temperature beyond a set-point temperature during cure, such as, for example, the set-point temperature of an oven. An exotherm may be detected according to the methods described below in the Examples section. For example, the polymerizable composition may not exotherm during cure of the polymerizable composition when heated to a temperature of 75° C., such as when heated to a temperature of 100° C., such as when heated to a temperature of 75-100° C. For example, when the polymerizable composition is heated to a temperature of 75° C. in an oven, the temperature of the composition does not exceed 75° C. In contrast, other initiators known in the art may result in a runaway exothermic reaction during cure of the composition, in which the temperature of the monomer composition exceeds the set-point temperature of the oven due to the exothermic nature of the reaction of the components of the composition.

According to the present invention, the polymerizable composition may have a viscosity build rate of at least 4 cps/hour during cure when heated to a temperature of 75° C., such as at least 4.5 cps/hour, such as at least 5 cps/hour. Methods for measuring the viscosity build rate of the polymerizable composition are provided in the Examples section below.

The present invention also provides for a polymerizate comprising the polymerizable composition, as well as an optical article comprising the polymerizate of the polymerizable composition. As used herein, the term "polymerizate" refers to a polymerizable composition that has been subjected to a cure cycle resulting in the reaction of the components of the polymerizable composition and curing of the polymerizable composition. As used herein, the term "optical article" refers to solid articles for use in the field of optics, and specifically includes, but is not limited to, optical lenses, such as plano and ophthalmic lenses, sun lenses or sunglasses. The polymerizates and optical articles of the invention may be solid, transparent and substantially free of optical defects.

As discussed above, the polymerizable composition may be cured by subjecting the composition to a cure cycle. Accordingly, the present invention is directed to a polymerizate comprising the polymerizable composition cured by subjecting the polymerizable composition to a cure cycle. Exemplary cure cycles are provided in Tables 1a, 1b and 1c of the Examples section below.

The polymerizate may have an $N_e$ refractive index of at least 1.495, such as at least 1.499, such as at least 1.501, and may be no more than 1.510, such as no more than 1.504, such as no more than 1.503. The polymerizate may have an $N_e$ refractive index of 1.495 to 1.510, such as 1.499 to 1.504, such as 1.501 to 1.503. The $N_e$ refractive index can be measured using $N_e$ which is the refractive index measured at 20° C. at the mercury spectral line (546.07 nm) according to ASTM C1648-06 using a Metricon Model 2010M Prism Coupler (available from Metricon Corp.) refractometer.

The polymerizate may have an $N_d$ refractive index of at least 1.495, such as at least 1.496, such as at least 1.498, and may be no more than 1.505, such as no more than 1.502, such as no more than 1.501. The polymerizate may have an $N_d$ refractive index of 1.495 to 1.505, such as 1.496 to 1.502, such as 1.498 to 1.501. The $N_d$ refractive index can be measured using $N_d$ which is the refractive index measured at 20° C. at the helium spectral line (587.56 nm) according to ASTM C1648-06 using a Metricon Model 2010M Prism Coupler (available from Metricon Corp.) refractometer.

According to the present invention, the polymerizable composition may also result in a polymerizate having less defects than previously known compositions. For example, the polymerizate may possess less cracking or other surface defects than polymerizates resulting from previous compositions.

The present invention is also directed to the use of the organic peroxide described herein to cure the reaction product monomer composition described herein.

The present invention is also directed to the use of the polymerizable composition to make contact lenses, and to contact lenses comprising the polymerizate described herein.

The present invention is also directed to the method of making a polymerizable composition comprising combining the reaction product monomer composition and organic peroxide disclosed herein and mixing the components until homogenous.

The present invention is also directed to a polymerizable composition made by combining the reaction product monomer composition and organic peroxide disclosed herein and mixing the components until homogenous.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" allyl alcohol and "a" cyclic polyol, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

Clause 1. A polymerizable composition, comprising:

(A) a reaction product of (a) diethyleneglycol bischloroformate; (b) allyl alcohol; (c) a cyclic polyol selected from the group consisting of a cycloaliphatic polyol having at least one secondary hydroxyl group, a heterocyclic polyol having primary and/or secondary hydroxyl groups, and mixtures thereof; (d) optionally, ethyleneglycol bischloroformate; and (e) optionally, at least one linear or branched aliphatic polyol having two to six hydroxyl groups; and (B) an organic peroxide comprising at least three peroxide groups.

Clause 2. The polymerizable composition of clause 1, wherein the aliphatic polyol (e) is present and comprises a C2-C12 polyol with two to six hydroxyl groups.

Clause 3. The polymerizable composition of clause 1, wherein the aliphatic polyol (e) is present and is selected from the group consisting of ethylene glycol, diethylene glycol, propylene glycol, 1,3-propanediol, 1,2-butanediol, 1,4-butanediol, neopentyl glycol, 2-methyl-1,3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures of any of the foregoing.

Clause 4. The polymerizable composition of any of clauses 1 to 3, wherein the heterocyclic polyol (c) is selected from the group consisting of isohexide, 1,3,5-tris(2-hydroxyethyl)isocyanurate, and mixtures thereof.

Clause 5. The polymerizable composition of any of clauses 1 to 4, wherein the heterocyclic polyol (c) is isohexide selected from the group consisting of isosorbide, isoidide, and isomannide.

Clause 6. The polymerizable composition of any of clauses 1 to 5, wherein an equivalents ratio of total equivalents of hydroxyls to total equivalents of chloroformate is 1 to 1.5:1.

Clause 7. The polymerizable composition of any of clauses 1 to 6, wherein the composition further comprises an additional component selected from the group consisting of triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

Clause 8. The polymerizable composition of any of clauses 1 and 4 to 7, wherein the reaction product comprises at least one compound represented by:

(a) Formula I

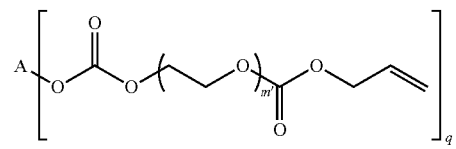

where A represents a residue from the at least one cyclic polyol, m' is equal to 1 or 2, and q is equal to the number of hydroxyl groups on the at least one cyclic polyol; and (b) at least one of Formula II

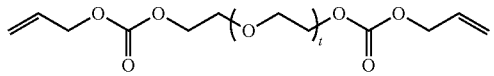

where t is equal to 0 or 1.

Clause 9. The polymerizable composition of any of clauses 1 and 4 to 8, wherein the reaction product comprises at least one compound represented by:
(a) Formula I'

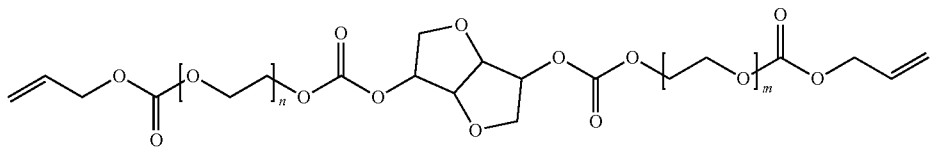

where m and n are each independently 1 or 2; and
(b) at least one of Formula II

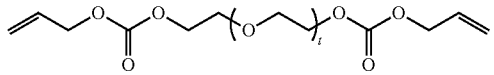

where t is equal to 0 or 1.

Clause 10. The polymerizable composition of any of clauses 1 to 7, wherein the reaction product comprises at least one compound represented by:
(a) Formula I

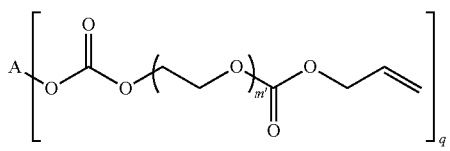

where A represents a residue from the at least one cyclic polyol,
m' is equal to 1 or 2, and
q is equal to the number of hydroxyl groups on the at least one cyclic polyol; and (b) Formula II'

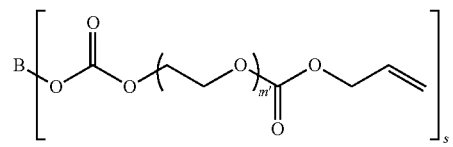

where B represents a residue from the at least one linear or branched aliphatic polyol,
m' is equal to 1 or 2, and
s is equal to the number of hydroxyl groups on the at least one linear or branched aliphatic polyol; and
(c) at least one of Formula II

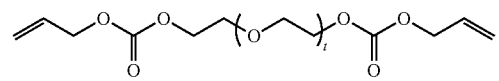

where t is equal to 0 or 1.

Clause 11. The polymerizable composition of any of clauses 1 to 7 and 10, wherein the reaction product comprises at least one compound represented by:
(a) Formula I'

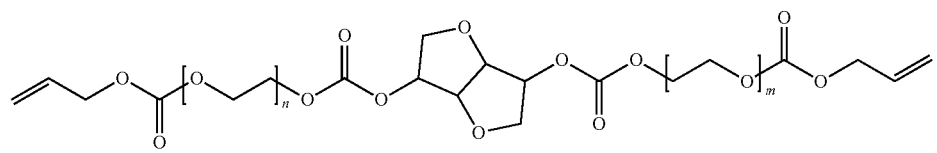

where m and n are each independently 1 or 2; and
(b) Formula II'

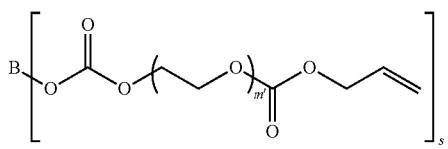

where B represents a residue of the at least one linear or branched aliphatic polyol,
m' is equal to 1 or 2, and
s is equal to the number of hydroxyl groups on the at least one linear or branched aliphatic polyol; and
(c) at least one of Formula II

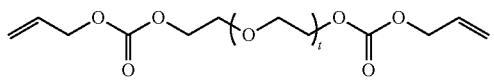

where t is equal to 0 or 1.

Clause 12. A polymerizable composition, comprising:
(A) a reaction product of (a) allyl alcohol; (b) a cyclic polyol selected from the group consisting of a cycloaliphatic polyol having at least one secondary hydroxyl group, a heterocyclic polyol having primary and/or secondary hydroxyl groups, and mixtures thereof; (c) ethyleneglycol bischloroformate; and (d) optionally, at least one linear or branched aliphatic polyol having two to six hydroxyl groups; and
(B) an organic peroxide comprising at least three peroxide groups.

Clause 13. The polymerizable composition of clause 12, wherein the aliphatic polyol (d) is present and comprises a C2-C12 polyol with two to six hydroxyl groups.

Clause 14. The polymerizable composition of clause 12, wherein the aliphatic polyol (d) is present and is selected from the group consisting of ethylene glycol, diethylene glycol, propylene glycol, 1,3-propanediol, 1,2-butanediol, 1,4-butanediol, neopentyl glycol, 2-methyl-1,3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures of any of the foregoing.

Clause 15. The polymerizable composition of any of clauses 12 to 14, wherein the heterocyclic polyol (c) is selected from the group consisting of isohexide, 1,3,5-tris (2-hydroxyethyl)isocyanurate, and mixtures thereof.

Clause 16. The polymerizable composition of clause 15, wherein the heterocyclic polyol (c) is isohexide selected from the group consisting of isosorbide, isoidide, and isomannide.

Clause 17. The polymerizable composition of any of clauses 12 to 16, wherein an equivalents ratio of total equivalents of hydroxyls to total equivalents of chloroformate is 1 to 1.5:1.

Clause 18. The polymerizable composition of any of clauses 12 to 17, wherein the composition further comprises an additional component selected from the group consisting of triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

Clause 19. The polymerizable composition of any of clauses 12 and 15 to 18, wherein the reaction product comprises at least one compound represented by:
(a) Formula I

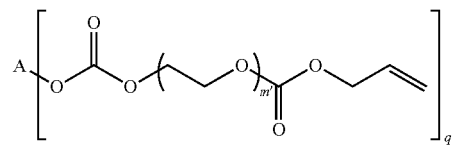

where A represents a residue from the at least one cyclic polyol,
m' is equal to 1 or 2, and
q is equal to the number of hydroxyl groups on the at least one cyclic polyol; and
(b) at least one of Formula II

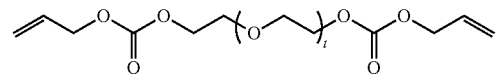

where t is equal to 0 or 1.

Clause 20. The polymerizable composition of any of clauses 12 and 15 to 19, wherein the reaction product comprises at least one compound represented by:
(a) Formula I'

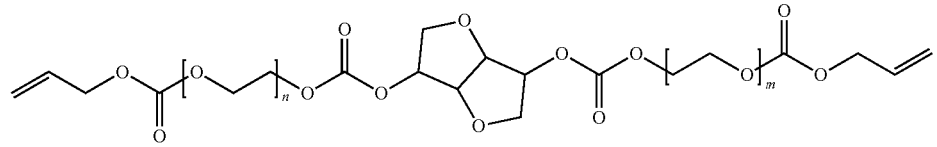

where m and n are each independently 1 or 2; and
(b) at least one of Formula II

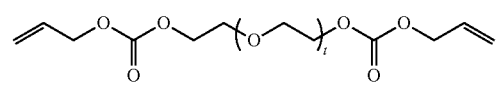

where t is equal to 0 or 1.

Clause 21. The polymerizable composition of any of clauses 12 to 18, wherein the reaction product comprises at least one compound represented by:

(a) Formula I

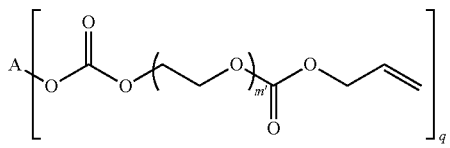

where A represents a residue from the at least one cyclic polyol,
m' is equal to 1 or 2, and
q is equal to the number of hydroxyl groups on the at least one cyclic polyol; and
(b) Formula II'

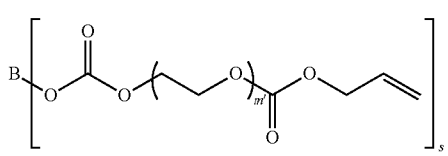

where B represents a residue from the at least one linear or branched aliphatic polyol,
m' is equal to 1 or 2, and
s is equal to the number of hydroxyl groups on the at least one linear or branched aliphatic polyol; and
(c) at least one of Formula II

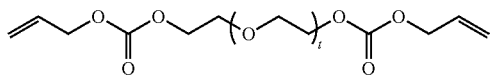

where t is equal to 0 or 1.

Clause 22. The polymerizable composition of any of clauses 12 to 18 and 21, wherein the reaction product comprises at least one compound represented by:
(a) Formula I'

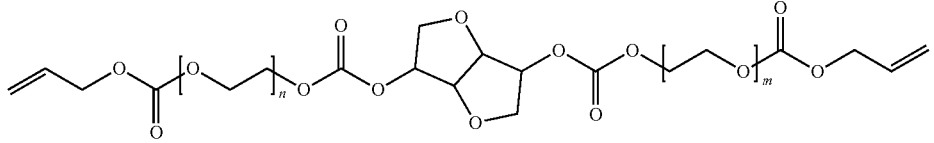

where m and n are each independently 1 or 2; and
(b) Formula II'

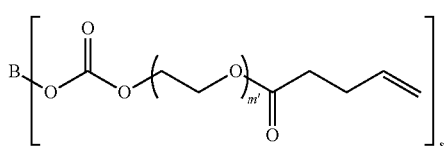

where B represents a residue of the at least one linear or branched aliphatic polyol,
m' is equal to 1 or 2, and
s is equal to the number of hydroxyl groups on the at least one linear or branched aliphatic polyol; and (c) at least one of Formula II

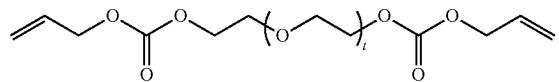

where t is equal to 0 or 1.

Clause 23. A polymerizable composition comprising:
(A) a reaction product of:
(a) diethyleneglycol bischloroformate, ethyleneglycol bischloroformate, or combinations thereof;
(b) allyl alcohol;
(c) optionally, a cyclic polyol selected from the group consisting of a cycloaliphatic polyol having at least one secondary hydroxyl group, a heterocyclic polyol having primary and/or secondary hydroxyl groups, and mixtures thereof; and
(d) optionally, at least one linear or branched aliphatic polyol having two to six hydroxyl groups; and
(B) an organic peroxide comprising at least three peroxide groups.

Clause 24. A polymerizable composition comprising:
(A) a radically polymerizable monomer represented by:

Formula I

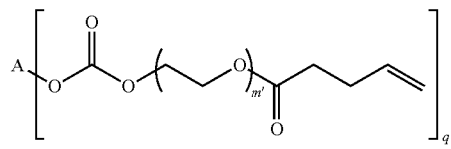

where A represents a residue from at least one cyclic polyol,
m' is equal to 1 or 2, and q is equal to the number of hydroxyl groups on the at least one cyclic polyol; and
(B) an organic peroxide comprising at least three peroxide groups.

Clause 25. The polymerizable composition of any of any of clauses 1-24, wherein the organic peroxide comprises an organic peroxide branched oligomer comprising at least three peroxide groups.

Clause 26. The polymerizable composition of clause 25, wherein at least one peroxide group of the organic peroxide comprises at least one moiety selected from the group consisting of peroxycarbonates, peroxyketals and peresters.

Clause 27. The polymerizable composition of clauses 25 or 26, wherein the organic peroxide comprises a tri(mono-t-alkylperoxycarbonate) compound, such as a tri(mono-t-butylperoxycarbonate) compound, or a tetra(mono-t-alkylperoxycarbonate) compound, such as a tetra(mono-t-butylperoxycarbonate) compound.

Clause 28. The polymerizable composition of clause 27, wherein the tetra(mono-t-alkylperoxycarbonate) compound comprises a polyether tetrakis(mono-t-alkylperoxycarbonate), such as a polyether tetrakis(mono-t-butylperoxycarbonate) compound.

Clause 29. The polymerizable composition of clauses 25 or 26, wherein the organic peroxide comprises a compound represented by structure A:

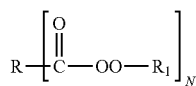

A wherein N is an integer from 3 to 4; $R_1$ is each independently a tertiary-alkyl radical group having from 4 to 10 carbons; and R is a polyether compound having three to four branched alkyloxy radical groups.

Clause 30. The polymerizable composition of clause 29, wherein the branched alkyloxy radical groups of the polyether compound R are selected from $CH_3-C(CH_2-O-)_3$, $C(CH_2-O-)_4$, and R has a structure according to structure B or structure C:

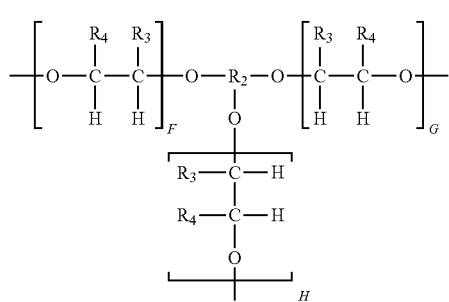

B

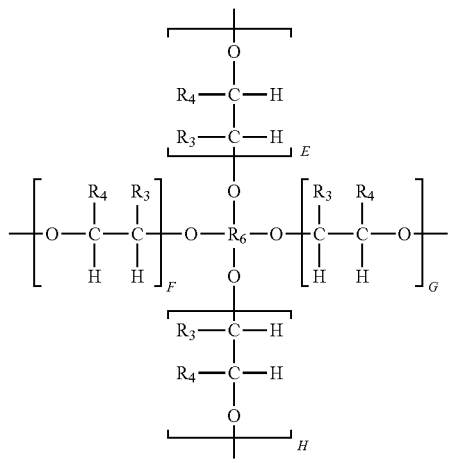

C wherein $R_2$ is a branched trifunctional alkyl radical having the structure $CH_3-C(CH_2-)_3$, or a branched trifunctional alkyl radical having the structure

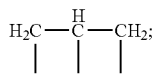

$R_6$ is a branched tetrafunctional alkyl radical having the structure $C(CH_2-)_4$; $R_3$ and $R_4$ are independently selected from hydrogen and alkyl radicals containing 1 to 4 carbons; and E, F, G and H are integers from 1 to 4.

Clause 31. The polymerizable composition of clause 29 or 30, wherein the organic peroxide comprises a compound represented by structure D:

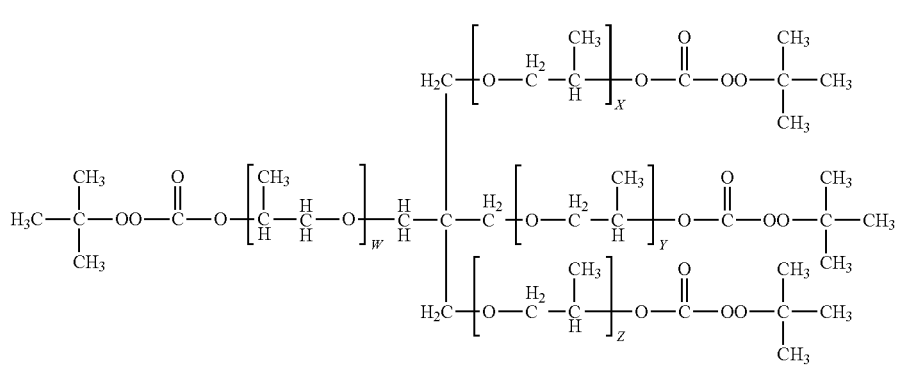

D wherein the sum of W, X, Y and Z is 6 or 7.

Clause 32. The polymerizable composition of clauses 1-31, wherein the organic peroxide has a theoretical molecular weight of about 400 to about 3,500 g/mole, such as about 600 to about 2,500 g/mole, such as about 700 to about 2,000 g/mole, such as about 800 to about 1,500 g/mole.

Clause 33. The polymerizable composition of clauses 1-32, wherein the organic peroxide has an ambient temperature storage stability of at least two months, such as at least three months, such as at least four months, such as at least five months.

Clause 34. The polymerizable composition of clauses 1-33, wherein the organic peroxide has a 60-minute half-life temperature above 99° C.

Clause 35. The polymerizable composition of clauses 1-34, wherein the organic peroxide is present in the polymerizable composition in an amount of 0.1% to 5% by weight, such as 0.5% to 3% by weight, such as 1% to 2% by weight, such as 1.4% to 1.6% by weight, based on the total composition weight.

Clause 36. The polymerizable composition of clauses 1-35, wherein the polymerizable composition further comprises a soluble dye.

Clause 37. The polymerizable composition of Clause 36, wherein the soluble dye is stable in the presence of the organic peroxide.

Clause 38. The polymerizable composition of clauses 1-37, wherein the polymerizable composition has a gel time of less than 100 minutes when heated to a temperature of 100° C. and an organic peroxide level of 1.50% by weight, based on the total composition weight.

Clause 39. The polymerizable composition of clauses 1-38, wherein the polymerizable composition does not exhibit a detectable exotherm when heated to a temperature of about 75-100° C.

Clause 40. The polymerizable composition of clauses 1-39, wherein the polymerizable composition has a viscosity build rate of at least 4 cps/hour during cure when heated to a temperature of 75° C., such as at least 4.5 cps/hour, such as at least 5 cps/hour.

Clause 41. A polymerizate, comprising the polymerizable composition of any of clauses 1 to 40.

Clause 42. The polymerizate of clause 41, wherein the polymerizate has a $N_e$ refractive index of 1.495 to 1.510, such as 1.499 to 1.504, such as 1.501 to 1.503.

Clause 43. The polymerizate of clause 41 or 42, wherein the polymerizate has a $N_d$ refractive index of 1.495 to 1.505, such as 1.496 to 1.502, such as 1.498 to 1.501.

Clause 44. An optical article, comprising the polymerizable composition of any of clauses 1 to 40.

Clause 45. An optical article, comprising the polymerizate of any of clauses 41-43.

Illustrating the invention are the following examples, which, however, are not to be considered as limiting the invention to their details. Unless otherwise indicated, all parts and percentages in the following examples, as well as throughout the specification, are by weight.

EXAMPLES

Polymerizable Compositions

Experimental and comparative polymerizable composition were prepared according to the formulations provided in Table 1. For each example, the monomer composition (either experimental CR-39® NLS Monomer, available from PPG Industries, Inc. or the comparative CR-39® HiADC Monomer, also available from PPG Industries, Inc.) and an initiator (either experimental JWEB™ 50 peroxide initiator (polyether poly(t-butyl)-peroxycarbonate), available from ARKEMA, or a comparative initiator having less than three peroxide groups selected from TRIGONOX® ADC-NS-60 ("NS-60") peroxide initiator (a 60% mixture of peroxydicarbonates in diethylene glycol bis(allyl carbonate), available from Akzo Nobel Polymer Chemicals LLC), 00-(t-butyl) 0-(2-ethylhexyl) monoperoxycarbonate (TBEC, available from ARKEMA), and LUPEROX® A98 Benzoyl Peroxide initiator ("BPO"), available from Sigma Aldrich), and optionally a release agent and/or soluble dye, as specified in Table 1, were placed in a polypropylene container and thoroughly mixed for approximately 15 minutes with a magnetic stirrer.

TABLE 1

Polymerizable Compositions

| Ex. # | Monomer and Amount (g) | | Initiator and Amount (g) | | Release Agent[1] and Amount (g) | | Soluble Dye[2] and Amount (g) | | Total Amt. |
|---|---|---|---|---|---|---|---|---|---|
| Exp. 1 | CR-39 ® NLS | 98.5 | JWEB ™ 50 | 1.5 | NONE | 0 | NONE | 0 | 100 g |
| Exp. 2 | CR-39 ® NLS | 98.1 | JWEB ™ 50 | 1.5 | Moldwiz OG1681 | 0.4 | NONE | 0 | 100 g |
| Comp. 3 | CR-39 ® HiADC | 98.5 | JWEB ™ 50 | 1.5 | NONE | 0 | NONE | 0 | 100 g |
| Comp. 4 | CR-39 ® HiADC | 98.1 | JWEB ™ 50 | 1.5 | Moldwiz OG1681 | 0.4 | NONE | 0 | 100 g |
| Comp. 5 | CR-39 ® NLS | 94.78 | NS-60 | 5.22 | NONE | 0 | NONE | 0 | 100 g |
| Comp. 6 | CR-39 ® NLS | 94.38 | NS-60 | 5.22 | Moldwiz OG1681 | 0.4 | NONE | 0 | 100 g |
| Exp. 7 | CR-39 ® NLS | 95.04 | JWEB ™ 50 | 1.5 | NONE | 0 | Macrolex Violet 3R | 3.46 | 100 g |
| Exp. 8 | CR-39 ® NLS | 94.64 | JWEB ™ 50 | 1.5 | Moldwiz OG1681 | 0.4 | Macrolex Violet 3R | 3.46 | 100 g |
| Comp. 9 | CR-39 ® HiADC | 95.04 | JWEB ™ 50 | 1.5 | NONE | 0 | Macrolex Violet 3R | 3.46 | 100 g |
| Comp. 10 | CR-39 ® NLS | 90.92 | NS-60 | 5.22 | Moldwiz OG1681 | 0.4 | Macrolex Violet 3R | 3.46 | 100 g |
| Comp. 11 | CR-39 ® HiADC | 90.92 | NS-60 | 5.22 | Moldwiz OG1681 | 0.4 | Macrolex Violet 3R | 3.46 | 100 g |
| Comp. 12 | CR-39 ® HiADC | 94.78 | NS-60 | 5.22 | NONE | 0 | NONE | 0 | 100 g |
| Comp. 13 | CR-39 ® NLS | 94.78 | NS-60 | 5.22 | NONE | 0 | NONE | 0 | 100 g |
| Comp. 14 | CR-39 ® HiADC | 98.5 | JWEB ™ 50 | 1.5 | NONE | 0 | NONE | 0 | 100 g |
| Exp. 15 | CR-39 ® NLS | 98.5 | JWEB ™ 50 | 1.5 | NONE | 0 | NONE | 0 | 100 g |
| Comp. 16 | CR-39 ® HiADC | 98 | BPO | 2.0 | NONE | 0 | NONE | 0 | 100 g |
| Comp. 17 | CR-39 ® NLS | 98 | BPO | 2.0 | NONE | 0 | NONE | 0 | 100 g |

[1] 1.0 g of Moldwiz was mixed into 99.00 g CR-39 ® HiADC or NLS Monomer. 0.4 g of the concentrate was added to the formulation. The actual level of Moldwiz in the final formulation was 40 ppm.
[2] 0.01 g of solid dye powder was mixed into 99.99 g CR-39 ® HiADC or NLS and 3.46 g of the concentrate was added to the formulation. The actual level of dye in the final formulations was 3.46 ppm.

The resulting solutions were each filled into a mold assembly having two flat disk-shaped tempered glass molds (approximately 80 mm in diameter), separated by a 3.4 mm thick, 74 mm diameter PVC gasket and clamped together. The mold assembly was placed in a programmable oven, and each sample was polymerized using one of the cure cycles 1, 2 or 3, as indicated in Table 2 below, and described below in Tables 1a (Cure Cycle 1), 1b (Cure Cycle 2) and 1c (Cure Cycle 3). Examples 1-11 were analyzed for dye survivability and Examples 12-17 were analyzed for refractive index.

TABLE 1a

Cure conditions
Cure Cycle 1 (max. temp. 130° C.)

| Step | Cumulative Hours | Temperature (° C.) |
|---|---|---|
| 1 | 0 | 100° C. (initial) |
| 2 | 4 | 100° C. (hold @ 100° C.) |
| 3 | 19 | 130° C. (Ramp from 100° C. to 130° C.) |
| 4 | 22 | 130° C. (Hold @ 130° C.) |
| 5 | 23 | 85° C. (ramp from 130° C. to 85° C.) |

TABLE 1b

Cure conditions
Cure Cycle 2 (max. temp. 72° C.)

| Step | Cumulative Hours | Temperature (° C.) |
|---|---|---|
| 1 | 0 | 40° C. (initial) |
| 2 | 4 | 40° C. (hold @ 40° C.) |
| 3 | 13 | 58° C. (Ramp from 40° C. to 58° C.) |
| 4 | 15.5 | 72° C. (Ramp from 58° C. to 72° C.) |
| 5 | 17.5 | 72° C. (hold @ 72° C.) |
| 6 | 18 | 70° C. (Ramp from 72° C. to 70° C.) |

TABLE 1c

Cure conditions
Cure Cycle 3 (max. temp. 95° C.)

| Step | Cumulative Hours | Temperature (° C.) |
|---|---|---|
| 1 | 0 | 71° C. (initial) |
| 2 | 8 | 77° C. (Ramp from 71° C. to 77° C.) |
| 3 | 10 | 79° C. (Ramp from 77° C. to 79° C.) |
| 4 | 12 | 82° C. (Ramp from 79° C. to 82° C.) |
| 5 | 15 | 95° C. (Ramp from 82° C. to 95° C.) |
| 6 | 18 | 95° C. (hold @ 95° C.) |
| 7 | 19 | 80° C. (Ramp from 95° C. to 80° C.) |

Analysis of Dye Survivability

For Examples 1-11, some of the examples are a comparative to a composition with no dye present, while others are prepared with varying levels of dye. The monomer, initiator and dyes are indicated in Table 2 (as well as the composition provided in Table 1). Compositions that also included a mold release agent are indicated with a "*" next to the example number. Testing was performed according to ASTM E313-10 using a Hunterlab Ultrascan XE/Sphere Spectrocolorimeter (Serial #: 1292). The results are provided in Table 2 below.

TABLE 2

Dye Evaluation

| Ex. # | Monomer and Amount (g) | | Initiator and Amount (g) | | Soluble Dye[2] and Amt. (g) | | Cure Cycle | a* | b* | Polymer Thick. |
|---|---|---|---|---|---|---|---|---|---|---|
| Exp. 1 | CR-39 ® NLS | 98.5 | JWEB ™ 50 | 1.5 | NONE | 0 | 1 (130° C.) | −0.2 | 0.72 | 3.4 mm |
| Exp. 2* | CR-39 ® NLS | 98.1 | JWEB ™ 50 | 1.5 | NONE | 0 | 1 (130° C.) | −0.4 | 1.49 | 3.4 mm |
| Comp. 3 | CR-39 ® HiADC | 98.5 | JWEB ™ 50 | 1.5 | NONE | 0 | 1 (130° C.) | −0.16 | 0.66 | 3.4 mm |
| Comp. 4* | CR-39 ® HiADC | 98.1 | JWEB ™ 50 | 1.5 | NONE | 0 | 1 (130° C.) | −0.09 | 0.51 | 3.4 mm |
| Comp. 5 | CR-39 ® NLS | 94.78 | NS-60 | 5.22 | NONE | 0 | 2 (72° C.) | −0.17 | 0.65 | 3.4 mm |
| Comp. 6* | CR-39 ® NLS | 94.38 | NS-60 | 5.22 | NONE | 0 | 2 (72° C.) | −0.18 | 0.63 | 3.4 mm |
| Exp. 7 | CR-39 ® NLS | 95.04 | JWEB ™ 50 | 1.5 | Macrolex Violet 3R | 3.46 | 1 (130° C.) | 1.02 | 2.52 | 3.4 mm |
| Exp. 8* | CR-39 ® NLS | 94.64 | JWEB ™ 50 | 1.5 | Macrolex Violet 3R | 3.46 | 1 (130° C.) | 0.7 | 3.87 | 3.4 mm |
| Comp. 9 | CR-39 ® HiADC | 95.04 | JWEB ™ 50 | 1.5 | Macrolex Violet 3R | 3.46 | 1 (130° C.) | 0.73 | 3.33 | 3.4 mm |
| Comp. 10* | CR-39 ® NLS | 90.92 | NS-60 | 5.22 | Macrolex Violet 3R | 3.46 | 2 (72° C.) | 0.33 | 1.92 | 3.4 mm |
| Comp. 11* | CR-39 ® HiADC | 90.92 | NS-60 | 5.22 | Macrolex Violet 3R | 3.46 | 2 (72° C.) | 0.27 | 1.33 | 3.4 mm |

[2]0.01 g of solid dye powder was mixed into 99.99 g CR-39 ® HiADC or NLS and 3.46 g of the concentrate was added to the formulation. The actual level of in the final formulations was 3.46 ppm.
*next to the example number indicates the presence of Moldwiz OG1681 in the formulation.

When red MACROLEX® Violet 3R soluble dye was included in the compositions, the a* values were improved in compositions that included JWEB™ 50 as the initiator when compared to compositions that included NS-60 as the initiator despite the same amount of dye being present in each composition. These results indicate that MAC-ROLEX® Violet 3R dye was stable in the presence of JWEB™ 50 while the soluble dye was degraded in the presence of the NS-60 initiator. This indicates that the MACROLEX® Violet 3R dye is stable in the presence of JWEB™ 50 and the compositions including JWEB™ 50 possess dye survivability. The stability of the soluble dyes in the presence of the JWEB™ 50 initiator was an unexpected result and a desirable property that provides an advantage over previous initiators and polymerizable compositions.

Analysis of Refractive Index

Each monomer composition and initiator was analyzed for refractive index as measured according to ASTM C1648-06 using a Metricon Model 2010M Prism Coupler (available from Metricon Corp.) refractometer. The results are provided in Table 3 below.

TABLE 3

Analysis of Refractive Index

| Ex.# | Monomer and Amount (g) | | Initiator and Amount (g) | | Cure Cycle | Polymer Thickness | Refractive Index Ne | Refractive Index Nd |
|---|---|---|---|---|---|---|---|---|
| Comp. 12 | CR-39 ® HiADC | 94.78 | NS-60 | 5.22 | 2 (72° C.) | 3.4 mm | 1.5010 | 1.4988 |
| Comp. 13 | CR-39 ® NLS | 94.78 | NS-60 | 5.22 | 2 (72° C.) | 3.4 mm | 1.5011 | 1.499 |
| Comp. 14 | CR-39 ® HiADC | 98.5 | JWEB ™ 50 | 1.5 | 1 (130° C.) | 3.4 mm | 1.503 | 1.5012 |
| Exp. 15 | CR-39 ® NLS | 98.5 | JWEB ™ 50 | 1.5 | 1 (130° C.) | 3.4 mm | 1.5031 | 1.501 |
| Comp. 16 | CR-39 ® HiADC | 98 | BPO | 2.0 | 3 (95° C.) | 3.4 mm | 1.5052 | 1.5031 |
| Comp. 17 | CR-39 ® NLS | 98 | BPO | 2.0 | 3 (95° C.) | 3.4 mm | 1.5043 | 1.5022 |

It is desirable to achieve refractive indexes as close as possible to what previous polymerizable compositions were able to achieve. For example, compositions using the NS-60 initiator may achieve a $N_e$ refractive index of about 1.501 and a $N_d$ refractive index of about 1.499. The results shown in Table 3 demonstrate that compositions using the JWEB™ 50 initiator are able to achieve similar refractive index values, and that the refractive index values achieved with JWEB™ 50 are closer to the refractive indexes achieved by NS-60 than those achieved with the BPO initiator.

Analysis of Gel Time, Exothermic Activity and Viscosity Build

Experimental and comparative polymerizable composition were prepared according to the formulations provided in Table 4. For each example, the monomer composition (CR-39® NLS Monomer, available from PPG Industries, Inc. or comparative CR-39® HiADC Monomer, also available from PPG Industries, Inc.) and an initiator (JWEB™ 50 peroxide initiator (polyether poly(t-butyl)-peroxycarbonate), available from ARKEMA, or a comparative initiator selected from TRIGONOX® ADC-NS-60 ("NS-60") peroxide initiator (a 60% mixture of peroxydicarbonates in diethylene glycol bis(allyl carbonate), available from Akzo Nobel Polymer Chemicals LLC), and 00-(t-butyl) 0-(2-ethylhexyl) monoperoxycarbonate (TBEC, available from ARKEMA)), as specified in Table 4, were placed in a polypropylene container and thoroughly mixed for approximately 15 minutes with a magnetic stirrer. The initiator level is provided as % by weight based on the total weight of the composition with the remaining content of the composition comprising the monomer composition indicated for each example.

Different initiator concentrations were used for the experiments depending on the type of initiator present in the blend being tested. The initiator concentrations were defined based on the typical concentrations used in the industry that in combination with standard curing cycles deliver the desired properties in the fully cured polymer, such as Fisher micro hardness, polymeric conversion percentage (as determined by carbon-carbon double bond peak height monitoring by means of Infra-Red spectroscopy), residual heat (as measured by differential scanning calorimetry) and tinting rate among others. The gelation experiments were conducted at constant temperature. The temperatures for gelation ranged from 38° C. to 100° C. This range was determined considering the initial temperatures of standard cure cycles used in the lens casting industry for TRIGONOX® ADC-NS60 (38° C.), the 10-hour half-life temperature for both TBEC and JWEB™ 50 (100° C.) and an intermedium temperature to evaluate the 3 initiators (75° C.).

System for Measuring Gel Time:

The gel time was determined using a Shyodu Stable-temp Gel timer. 100 g of one of the polymerizable compositions of Examples 18 through 29 listed below in Table 4 were poured into an aluminum cup. The aluminum cup was placed into the temperature controlled hot-pot of the gel timer, and the spindle was set in place. The gel timer chamber was insulated from the room atmosphere using aluminum foil sealed with adhesive tape. Nitrogen gas flow was directed inside the chamber to create an inert atmosphere to prevent polymerization inhibition by the presence of oxygen. Once the target temperature was reached, the timer was started. The temperature of the polymerizable composition and the hot pot was monitored and recorded during the reaction using thermocouples connected to an Omega HH309A Temperature data logger. The results are provided below in Table 4.

System for Measuring Exothermic Activity:

The occurrence of an exothermic reaction during polymerization was monitored in an independent system. 200 g of one of the polymerizable compositions of Examples 18 through 29 listed below in Table 4 were poured into molds constructed with 6"×6" glass sheets, separated by a silicone spline and held together with clips to produce a 6.3 mm thick cavity between the sheets. The casted sheets were placed in an air convection oven programed with a constant temperature cycle. A type K thermocouple was introduced into the mold filled with polymerizable composition. The thermocouple was connected to an Omega HH309A Temperature data logger. The compositions were heated to the temperature listed in Table 4, and the temperature recordings interval during testing was 5 seconds. The peak exothermic temperature reached (if any) and the time the temperature was reached is reported in Table 4. Samples in which an exotherm was not observed are marked "No".

System for Measuring Viscosity Build:

The viscosity was monitored using a Brookfield CAP 2000+ variable speed viscometer. Less than 1 g of each polymerizable composition of Examples 18 through 29 listed below in Table 4 was used for the evaluation. The viscosity was measured every 4 min for a period of 6 hours. Measurements were made at 800-900 rpm. The viscometer maintained control of the sample temperature at the temperature indicated in Table 4. The viscometer chamber was insulated from the room atmosphere using aluminum foil sealed with adhesive tape. Nitrogen gas flow was directed inside the chamber to create an inert atmosphere to prevent polymerization inhibition by the presence of oxygen. The results are provided in Table 4 below.

TABLE 4

| Ex. # | Monomer | Initiator and Initiator Level | | Temp, ° C. | Gel Time (min) | Exothermic Activity | Viscosity build rate (Cps/hour) |
|---|---|---|---|---|---|---|---|
| Exp. 18 | CR-39® NLS | JWEB™ 50 | 1.50% | 100 | 97 | No | ND |
| Exp. 19 | CR-39® NLS | JWEB™ 50 | 1.50% | 75 | >24 hrs. | No | 5 |
| Comp. 20 | CR-39® NLS | TBEC | 0.75% | 100 | 115 | No | ND |
| Comp. 21 | CR-39® NLS | TBEC | 0.75% | 75 | >24 hrs. | No | 3.4 |
| Comp. 22 | CR-39® HiADC | JWEB™ 50 | 1.50% | 100 | 128 | No | ND |
| Comp. 23 | CR-39® HiADC | TBEC | 0.75% | 100 | 133 | No | ND |
| Comp. 24 | CR-39® NLS | NS-60 | 2.50% | 38 | 434 | No | 3.8 |
| Comp. 25 | CR-39® HiADC | NS-60 | 2.50% | 38 | 431 | No | 3.1 |
| Comp. 26 | CR-39® NLS | NS-60 | 2.50% | 75 | 16 | 21.5 min., 137° C. | >2500 cPs in 7 min |
| Comp. 27 | CR-39® HiADC | NS-60 | 2.50% | 75 | 13 | 18 min., 162° C. | >2700 cPs in 40 min |
| Comp. 28 | CR-39® HiADC | JWEB™ 50 | 1.50% | 75 | >24 hrs. | No | 0 |
| Comp. 29 | CR-39® HiADC | TBEC | 0.75% | 75 | >24 hrs. | No | 1.3 |

The results in Table 4 demonstrate that the combination of CR-39® NLS and JWEB™ 50 produced the fastest gel time without having exothermic activity or a runaway exothermic reaction (as in Examples 26 and 27). This was an unexpected result that provides an advantage over previous compositions that do not cure as quickly and/or resulted in a runaway exothermic reaction. The results further indicate that the combination of CR-39® NLS and JWEB™ 50 unexpectedly produced a unique combination of high viscosity build rate of the samples analyzed without having an exothermic runaway reaction (as in Examples 26 and 27). This unexpected combination of high viscosity build with no exothermic activity produced high quality lenses with less stress cracking and less surface defects, i.e., a cured polymer that better matches complex mold configurations.

Accordingly, the examples demonstrate that the polymerizable compositions of the present invention unexpectedly achieve faster gel times without exothermic activity, better viscosity build without exothermic activity, and stability towards soluble dyes. Additionally, the polymerizable compositions of the present invention demonstrate similar refractive indexes of previously used polymerizable compositions, which allows for lens manufacturers to retain current molds used for producing lenses. Furthermore, the polymerizates may be in the form of lenses and may retain excellent transparency, with no undesirable discoloration, no light distortion, and excellent mechanical properties, including, for example, scratch/impact resistance of the polymerizate. In addition, the polymerizable compositions may be to transport and/or store than previous polymerizable compositions. These properties are desirable and solve a need in the art.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:
1. A polymerizable composition comprising:
   (A) a reaction product of:
      (a) diethyleneglycol bischloroformate, ethyleneglycol bischloroformate, or combinations thereof;
      (b) allyl alcohol;
      (c) optionally, a cyclic polyol selected from the group consisting of a cycloaliphatic polyol having at least one secondary hydroxyl group, a heterocyclic polyol having primary and/or secondary hydroxyl groups, and mixtures thereof; and
      (d) optionally, at least one linear or branched aliphatic polyol having two to six hydroxyl groups; and
   (B) an organic peroxide comprising at least three peroxide groups.
2. The polymerizable composition of claim 1, wherein the aliphatic polyol (e) is present and comprises a $C_2$-$C_{12}$ polyol with two to six hydroxyl groups.
3. The polymerizable composition of claim 1, wherein an equivalents ratio of total equivalents of hydroxyls to total equivalents of chloroformate is 1 to 1.5:1.
4. The polymerizable composition of claim 1, wherein the reaction product comprises at least one compound represented by:

(a) Formula I

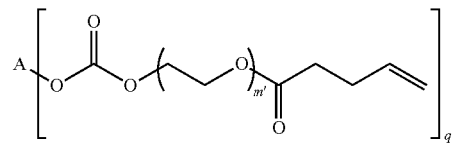

where A represents a residue from the at least one cyclic polyol,
m' is equal to 1 or 2, and
q is equal to the number of hydroxyl groups on the at least one cyclic polyol; and
(b) at least one of Formula II

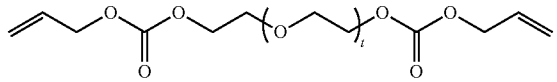

where t is equal to 0 or 1.
5. The polymerizable composition of claim 1, wherein the organic peroxide comprises an organic peroxide branched oligomer.
6. The polymerizable composition of claim 5, wherein the organic peroxide branched oligomer has a theoretical molecular weight of 400 g/mole to 3,500 g/mole.
7. The polymerizable composition of claim 5, wherein at least one peroxide group of the organic peroxide branched oligomer comprises at least one moiety selected from the group consisting of peroxycarbonates, peroxyketals, and peresters.
8. The polymerizable composition of claim 5, wherein peroxide groups of the organic peroxide branched oligomer comprise peroxycarbonate groups.
9. The polymerizable composition of claim 5, wherein the organic peroxide branched oligomer comprises structure A,

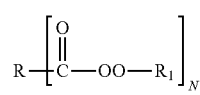

wherein N is an integer from 3 to 4; $R_1$ is each independently a tertiary-alkyl radical group having from 4 to 10 carbons; and R is a polyether compound having three to four branched alkyloxy radical groups.
10. The polymerizable composition of claim 9, wherein the branched alkyloxy radical groups are selected from $CH_3-C(CH_2-O-)_3$, $C(CH_2-O-)_4$, structure B or structure C;

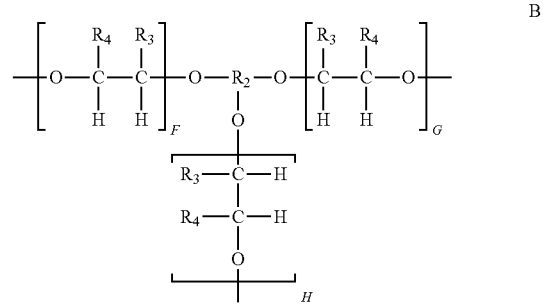

-continued

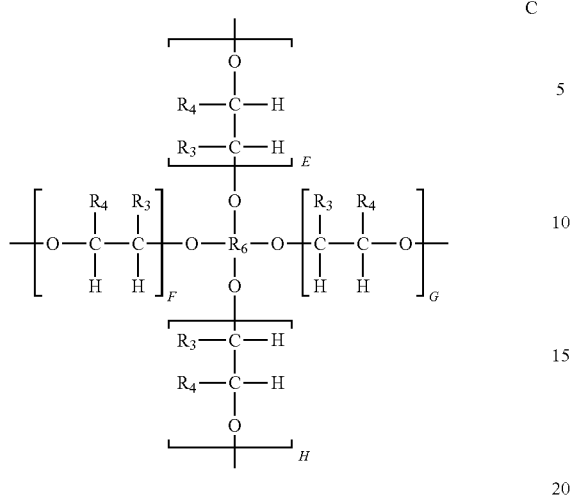

C wherein $R_2$ is a branched trifunctional alkyl radical having the structure $CH_3—C(CH_2—)_3$ or a branched trifunctional alkyl radical having the structure

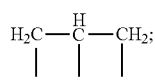

$R_6$ is a branched tetrafunctional alkyl radical having the structure $C(CH_2—)_4$; $R_3$ and $R_4$ are independently selected from hydrogen and alkyl radicals containing 1 to 4 carbons; and E, F, G and H are integers from 1 to 4.

11. The polymerizable composition of claim 9, wherein the organic peroxide branched oligomer has a theoretical molecular weight of 400 g/mole to 3,500 g/mole.

12. The polymerizable composition of claim 9, wherein the organic peroxide branched oligomer has an ambient temperature storage stability of at least two months.

13. The polymerizable composition of claim 9, wherein the organic peroxide branched oligomer has a 60-minute half-life temperature above 99° C.

14. The polymerizable composition of claim 9, wherein the organic peroxide branched oligomer comprising at least three peroxide groups comprises a compound represented by structure D:

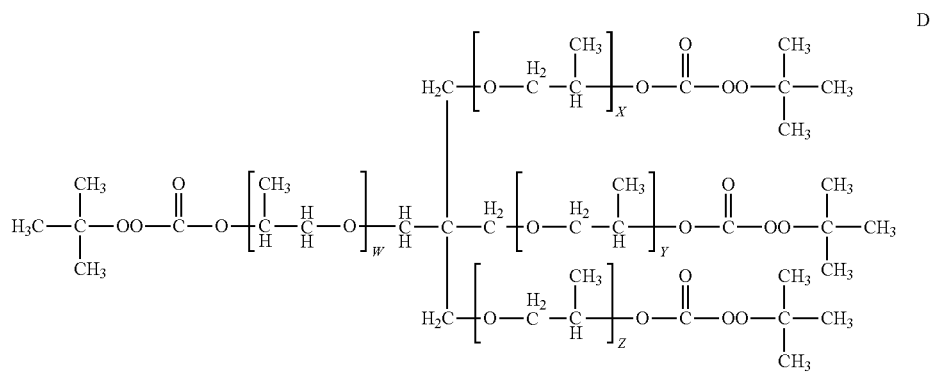

D wherein the sum of W, X, Y and Z is 6 or 7.

15. The polymerizable composition of claim 1, wherein the organic peroxide is present in an amount of 0.1 to 5% by weight, based on the total composition weight.

16. The polymerizable composition of claim 1, further comprising a soluble dye.

17. The polymerizable composition of claim 16, wherein the soluble dye is stable in the presence of the organic peroxide.

18. The polymerizable composition of claim 1, wherein the polymerizable composition has a gel time of less than 100 minutes when heated to a temperature of 100° C. and an organic peroxide branched oligomer level of 1.50% by weight, based on the total composition weight.

19. The polymerizable composition of claim 1, wherein the polymerizable composition does not exhibit an exotherm when heated to a temperature of 75-100° C.

20. The polymerizable composition of claim 1, wherein the polymerizable composition has a viscosity build rate of at least 4 cps/hour when heated to a constant temperature of 75° C., as determined using a Brookfield CAP 2000+ variable speed viscometer at 800-900 rpm in a sealed viscometer chamber under nitrogen gas flow and with a measurement taken every 4 minutes for a period of 6 hours.

21. A polymerizate, comprising the polymerizable composition of claim 1.

22. An optical article, comprising the polymerizable composition of claim 1.

23. A polymerizable composition, comprising:
(A) a radically polymerizable monomer represented by:

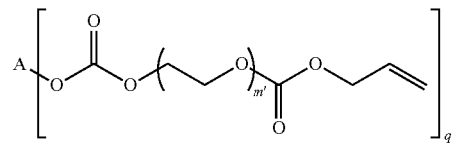

Formula I where A represents a residue from at least one cyclic polyol, m' is equal to 1 or 2, and q is equal to the number of hydroxyl groups on the at least one cyclic polyol; and (B) an organic peroxide comprising at least three peroxide groups.

* * * * *